United States Patent
Hatchell et al.

(10) Patent No.: US 9,581,709 B2
(45) Date of Patent: Feb. 28, 2017

(54) SUPPRESSING 4D-NOISE BY WEIGHTED STACKING OF SIMULTANEOUSLY ACQUIRED WAVE-FIELDS

(71) Applicant: SHELL OIL COMPANY, Houston, TX (US)

(72) Inventors: Paul James Hatchell, Katy, TX (US); Jorge Louis Lopez, Bellaire, TX (US); Johan Cornelis Hornman, The Hague (NL)

(73) Assignee: SHELL OIL COMPANY, Houston, TX (US)

( * ) Notice: Subject to any disclaimer, the term of this patent is extended or adjusted under 35 U.S.C. 154(b) by 233 days.

(21) Appl. No.: 14/369,039

(22) PCT Filed: Dec. 17, 2012

(86) PCT No.: PCT/US2012/070079
§ 371 (c)(1),
(2) Date: Jun. 26, 2014

(87) PCT Pub. No.: WO2013/101518
PCT Pub. Date: Jul. 4, 2013

(65) Prior Publication Data
US 2015/0168575 A1 Jun. 18, 2015

Related U.S. Application Data

(60) Provisional application No. 61/580,693, filed on Dec. 28, 2011.

(51) Int. Cl.
*G01V 1/30* (2006.01)
*G01V 1/34* (2006.01)

(52) U.S. Cl.
CPC .............. *G01V 1/345* (2013.01); *G01V 1/308* (2013.01); *G01V 2210/32* (2013.01);
(Continued)

(58) Field of Classification Search
CPC .............. G01V 1/345; G01V 2210/612; G01V 2210/6122; G01V 2210/6124; G01V 2210/74; G01V 1/308; G01V 2210/32
See application file for complete search history.

(56) References Cited

U.S. PATENT DOCUMENTS 5,638,338 A 6/1997 Feterson
8,687,463 B2 * 4/2014 Brain .............................. 367/38
(Continued)

OTHER PUBLICATIONS

PCT International Search Report, Application No. PCT/US2012/070079 dated Apr. 22, 2013.

*Primary Examiner* — Ian J Lobo

(57) ABSTRACT

A method for generating an image of a subsurface feature, comprises providing seismic data containing information about the feature, comprising i) a first dataset comprising a first up-going wave-field and a first down-going wave-field, ii) a second dataset comprising a second up-going wave-field and a second down-going wave-field, wherein the second dataset is collected at a time that is later than the first dataset by a time interval, creating an up-going 4D difference dataset U by subtracting one of the first and second up-going wave-fields from the other and creating a down-going 4D difference dataset D by subtracting one of the first and second down-going wave-fields from the other, creating a weighting function W that is a function of the similarity of the difference datasets, and creating an image of the feature by generating a 4D similarity stack, where the 4D similarity stack is defined as (U+D)*W/2.

24 Claims, 2 Drawing Sheets

(52) U.S. Cl.
CPC .................. *G01V 2210/612* (2013.01); *G01V 2210/6122* (2013.01); *G01V 2210/74* (2013.01)

(56) References Cited

U.S. PATENT DOCUMENTS

| | | |
|---|---|---|
| 2004/0076078 A1 | 4/2004 | Muijs et al. |
| 2006/0253256 A1 | 11/2006 | Robertson et al. |
| 2008/0130411 A1 | 6/2008 | Brandsberg-Dahl et al. |
| 2009/0245023 A1 | 10/2009 | Lie |
| 2009/0290449 A1* | 11/2009 | Smith ...................... G01V 1/28 367/38 |

* cited by examiner

SUPPRESSING 4D-NOISE BY WEIGHTED STACKING OF SIMULTANEOUSLY ACQUIRED WAVE-FIELDS

PRIORITY CLAIM

The present application is a National Stage (§371) application of PCT/US 2012/070079, filed Dec. 17, 2012, which claims priority from U.S. Provisional Application 61/580,693, filed Dec. 28, 2011, both of which are hereby incorporated by reference in their entirety.

FIELD OF THE INVENTION

The invention relates to seismic signal processing. More particularly, the invention relates to a method for producing two independent but simultaneous images of the subsurface, e.g., using up- and down-going wave-fields, and using a weighted stack of the up-going and down-going 4D differences based on their similarity to produce a reduced-noise image.

BACKGROUND OF THE INVENTION

In the field of seismic data processing, "4D-noise" is an expression used to describe non-repeatable noises recorded during seismic surveys that do not disappear when time-lapse seismic signals are compared. In deepwater seismic applications, 4D-noise can result from many sources, including imperfect repeats of acquisition geometry, differences in multiple energy due to changes in water velocities, seismic interference noise from other vessels, swell noise, etc. Likewise, 4D-noise onshore can result from seasonal changes in the shallow subsurface, time-varying receiver ghosts, etc.

In deepwater environments where seismic recordings are made using ocean bottom sensors such as nodes (OBN) or cables (OBC), it is possible to produce two independent images of the subsurface using the conventional up-going wave-field and the down-going wave-field, respectively, via the well-known technique of mirror migration. It is useful to think about how the 4D-signal and 4D-noise compare within these two types of images. The 4D-signals that result from changes in reservoir properties should be the same on both the up-going and down-going data once the signals have been corrected for differences in wavelets and effective fold. In contrast, 4D-noise behaves quite differently. For example, 4D noise due to multiple contamination as a result of differences in water velocities will arrive at different times relative to a horizon of interest on the up- and down-going wave-fields. Similar issues arise in any instance in which it is desirable to generate a single image from two independent but simultaneous images of the subsurface, namely the signal in both images will be the same but the noise in both images will be different.

One way of take advantage of the difference in noise signals is to stack the up- and down-going wave-fields, which effectively doubles the fold of the survey and statistically suppresses noises by a factor of $1/\sqrt{2}$. This method does not always give the desired level of enhancement, however and it remains desirable to provide an improved technique.

SUMMARY OF THE INVENTION

The present invention allows reduced-noise seismic images to be generated from 4D seismic signals. In some embodiments, 4D-noise is suppressed by stacking the up-going and down-going 4D differences after applying a weighting function that is based on how similar the differences are to one another.

According to some embodiments, a method for generating an image of a subsurface feature, comprises the steps of a) providing seismic data containing information about the feature, comprising a first dataset comprising a first up-going wave-field and a first down-going wave-field ($U_1$, $D_1$) and a second dataset comprising a second up-going wave-field and a second down-going wave-field ($U_2$, $D_2$), wherein the second dataset is collected at a time that is later than the first dataset by a time interval, b) creating an up-going 4D difference dataset U by subtracting one of the first and second up-going wave-fields $U_1$, $U_2$ from the other and creating a down-going 4D difference dataset D by subtracting one of the first and second down-going wave-fields $D_1$, $D_2$ from the other, c) creating a weighting function W that is a function of the similarity of the up-going 4D difference dataset and the down-going 4D difference dataset D; and e) creating an image of the feature by generating a 4D similarity stack, where the 4D similarity stack is defined as $(U+D)*W/2$.

The weighting function W may be selected from the functions of the group consisting of NRMSD, (1−NRMSD(U,D)/NRMSD_cutoff, $NRMSD^2$, average difference of absolute values, manual weighting, and powers of the foregoing functions. In preferred embodiments, the weighting function W is defined as $W=(1-NRMSD(U,D)/2)$, where $NRMSD(U,D)=2*RMS(U-D)/[RMS(U)+RMS(D)]$.

The seismic data may be gathered using at least one source on the water surface and at least one receiver on the seabed.

The method may further include the step of aligning $U_1$, $D_1$, $U_2$ and $D_2$ with each other and/or aligning $U_1$ with $U_2$ and aligning $D_1$ with $D_2$ and may also include the step of aligning the up-going 4D difference dataset U with the down-going 4D difference dataset D.

In some embodiments, the method includes the step of scaling the data in at least two datasets so as to equalize the energy in each of a plurality of gates. The weighting function may also include a gate and the gate that is used to scale the data may be larger than the gate used in the weighting function. In particular, the weighting function may be an RMS calculation that includes a gate, which may be less than 2 wavelengths, and the gate used to scale the data may be larger than the RMS gate. Thus, further, the RMS gate may selected to be less than 10 m.

The time interval over which the present method is applied may be at least one month or at least one year.

According to other embodiments, a method for generating an image of a subsurface feature, comprises the steps of a) providing seismic data containing information about the feature, comprising a primary wave-field and a secondary wave-field ($A_1$, $B_1$), b) creating a weighting function W that is a function of the similarity of the primary wave-field $A_1$ and the secondary wave-field $B_1$; and c) creating an image of the feature by generating a similarity stack, where the similarity stack is defined as $(A_1+B_1)*W/2$. The method may further include the step of repeating steps a)-c) after a time interval and calculating a time-lapse dataset by comparing the resulting two similarity stacks. The method may further include the step of scaling the primary wave-field and the secondary wave-field so as to equalize the energy in each of a plurality of gates. In some embodiments, the weighting function may include a gate and the gate used to scale the data may be larger than the gate used in the weighting function. The weighting function may be an RMS calculation that includes a RMS gate that is less than 2 wavelengths, wherein the gate used to scale the data may be larger than the RMS gate.

The primary wave-field may be time-aligned with the secondary wave-field.

The seismic data may be VSP data gathered using at least one source on the earth's surface and at least one receiver in a borehole or the seismic data may be cross-well data gathered using at least one source in a first borehole and at least one receiver in a second borehole. Alternatively, the seismic data may be gathered using at least one source and at least two receivers that are located at different depths and the seismic data at each receiver may contain an up-going wave-field and a down-going wave-field comprising a receiver ghost.

In still other embodiments, the seismic data may be gathered using at least two receiver types, including but not limited to pressure sensors, strain sensors, velocity sensors, and acceleration sensors.

BRIEF DESCRIPTION OF THE DRAWINGS

For a more detailed understanding of the invention, reference is made to the accompanying wherein.

While some preferred embodiments of the invention are described below with respect to a marine seismic system, it will be understood that the invention is applicable in any seismic system.

DETAILED DESCRIPTION OF A PREFERRED EMBODIMENTS

Figure 1:
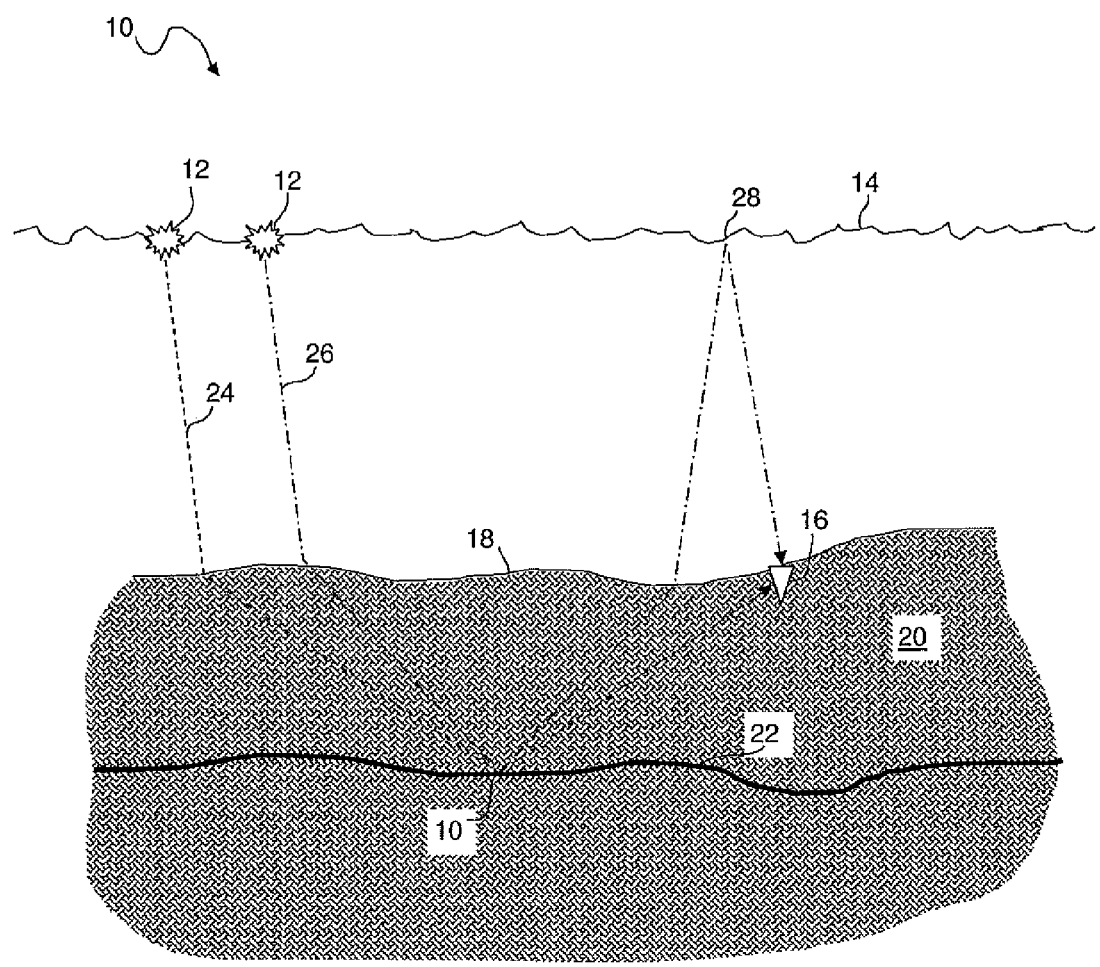
FIG. 1 is a schematic illustration of a marine seismic system in which the present invention can be used.

Referring initially to FIG. 1, a marine seismic system 10 in which the present invention is advantageous includes at least one acoustic source 12 on the water's surface 14 and at least one sensing node 16 on or near the seafloor 18. A subsurface feature of interest, illustrated as horizon 22, lies in the subsurface 20 beneath seafloor 18.

In system 10, there are multiple possible acoustic paths between each source 12 and sensing node 16. In particular, some paths will result in an up-going wave arriving at node 16, as illustrated at 24, and some paths will result in a down-going wave arriving at node 16, as illustrated at 26. Each down-going wave-field has an additional reflection 28 at the air-water interface where the reflection coefficient is close to −1.0. The down-going wave-field has two significant advantages over the up-going wave-field, namely, the down-going wave-field can image the near-seafloor environment and the down-going wave-field has a larger illumination area, resulting in increased fold at depth.

Data for either the up-going or down-going wave-field will include information about both horizon 22 (and/or other subsurface features) and noise present at the time of sensing. This is evident in Reverse-Time Migrated (RTM) depth images of the baseline seismic data. In preferred embodiments, the up-going data are time-aligned and/or depth-aligned to the down-going image so as to remove residual time shifts and are scaled to equalize the rms energy, as is known in the art. With no further processing, the up-going and down-going images appear very similar.

Using RTM data sets collected at different points in time, time-lapse (4D) differences can be generated by subtracting one data set from another and typically this is done after time alignment of the baseline and monitor seismic data. 4D differences can be generated using up- or down-going migrations. When 4D differences for up- and down-going wave-fields are aligned and compared, a number of 4D signals stand out well above the noise levels. If the aforementioned scaling to match the energy levels with the higher-fold down-going wave-field has been performed, the shallow portions of the up-going wave-field will contain more noise than the deeper portions.

Regardless, both the up- and down-going 4D difference sections will contain both 4D-signal and 4D-noise. The 4D signals result from changes in reservoir properties over time and should be nearly identical on the up-going and down-going data, with only minor differences expected due to changes in offset distributions and raypath-transmission-imaging issues. In contrast, the 4D-noise is expected to be completely different for the up- and down-going wave-fields. In other words, although noises from identical sources (e.g. multiples, swell noise, etc.) are present in both wave-fields, they will arrive at different times and positions.

One way to suppress 4D-noise is to simply stack the up- and down-going 4D differences. Stacking is a good way to reduce noise and for purely random noise this generates a statistical improvement of $(1/\sqrt{2})$. Visual inspection of the resulting image reveals that a stack of the 4D-differences looks somewhat less noisy than either of the inputs in the deeper portions, but is noisier in the shallow zones as compared with the down-going wave-field alone because of the noisier up-going data.

According to preferred embodiments of the invention, an alternative method of combining these datasets entails creating a weighted stack of the up- and down-going 4D differences using a weighting function based on the similarity of the two input datasets. By choosing the weighting function to be near 0.0 when the inputs are dissimilar and near 1.0 when they are similar, the 4D-noise can be muted.

According to some preferred embodiments, a good weighting function can be constructed based on the normalized root mean square (RMS) difference (NRMSD) of the 4D-difference data in a short gate that is preferable 0.5, 1, 1.5, or 2 wavelengths long. In one preferred embodiment, described below, this gate is less than 200 ft, less than 100 ft, or in some instances less than 10 ft.

In preferred embodiments where U and D represent the time-lapsed differences for the up- and down-going wave-fields, respectively, the NRMSD difference is:

$$NRMSD(U,D)=2.*RMS(U-D)/[RMS(U)+RMS(D)].$$

Possible NRMSD values range from 0 (identical) to 2 (identical but with opposite sign) and can be used to generate a weighting function $W=(1-NRMSD(U,D)/2)$.

While NRMSD is one preferred type of weighting function, it will be understood that any suitable weighting function W that is a function of the similarity of the two datasets can be used, including but not limited to the aforementioned $W=(1-NRMSD(U,D)/2)$. Thus, W can alternatively be defined as $(1-NRMSD(U,D)/NRMSD\_cutoff)$, in which values of NRMS above a predetermined cutoff value are set at zero, or can be based on $NRMSD^2$, or on an average difference of absolute values, manual weighting, and/or powers of any of the foregoing.

In embodiments where $W=1-NRMSD/NRMSD\_cutoff$, the cutoff value is set at or below 1 instead of allowing values between 1 and 2. This has the effect of suppressing noise more effectively, but at the expense of portions of the signal. In these embodiments, values of W less than zero are set to zero.

It will be understood that scaling and/or time alignment is preferably performed on each dataset as needed, preferably before calculating differences, stacking or other combinations of datasets. As is known in the art, scaling and alignment can be performed using matching filters.

According to preferred embodiments, a "4D similarity stack" is defined as (U+D)*W/2. When the data are noisy, the weighting function W will be near 0 and the 4D similarity stack will be small, effectively suppressing the 4D noises. In areas with true 4D signals, W will be near 1 and the signals will be preserved. An image of the 4D similarity stack derived using a 200 foot RMS gate showed a significant suppression of the 4D noise as compared to the non-weighted stack.

To quantify the reduction in noise in the weighted stack, the NRMSD function can be applied to the baseline and monitor data. By way of illustration only, in order to calculate this for the 4D similarity stack, an actual early down-going wave-field was used as the baseline data and a synthetic late (monitor) dataset was generated by subtracting the 4D similarity stack from the baseline. Comparisons of NRMSD(baseline, monitor) as calculated for the up-going, down-going and 4D similarity stack data in a 3000 foot gate centered at 15000 ft showed that NRMSD values are greatly reduced on the 4D similarity stack results and some of the underlying 4D signals stand out more from the noise.

As described, the similarity stack is effective at suppressing noise while preserving the desired 4D signal. In the following paragraphs, we compare theoretically what we expect in areas with and without 4D signal.

Case 1: Regions with Only Random Noise.

In regions with only random noise, we expect NRMSD (U,D)≈√2 and W≈0.3. The 4D similarity stack in this zone approximately equals 0.3*(U+D)/2, which reduces noise by a factor of 3 as compared with the conventional stack (U+D)/2.

Case 2: Regions with a False 4D Signal on Either the Up- or Down-Going Data.

In regions with large noise on one volume but not the other, NRMSD(U,D)≈2 and W≈0. In these regions, the 4D similarity stack does an excellent job of removing false 4D events.

Case 3: Regions with Both 4D Signal and 4D Noise.

To simplify calculations for this case, we assume that 1) the level of 4D noise on the up and down going waves are comparable, and 2) 4D noise has zero correlation between up- and down-going waves or with the 4D signal. With these assumptions, $$W = 1 - \frac{1}{\sqrt{2 + 2*SNR^2}}$$

where SNR=RMS(4D-signal)/RMS(4D-noise) is the signal-to-noise ratio. For large SNR, W will be close to 1, but in noisy areas the weighting will also suppress the 4D signal. When SNR=10, W=0.93 and most of the 4D signal is preserved. In contrast, when SNR=1, W=0.5, so that in very noisy areas the 4D similarity stack will partially mute the signal.

The method and examples described herein show that better time-lapse seismic data can be obtained in deepwater environments where seismic recordings are made using ocean bottom sensors such as nodes (OBN) or cables (OBC). Specifically, it is possible to produce two independent images of the subsurface using up- and down-going wave-fields. The 4D-signals should be nearly identical on these wave fields but the 4D noise differs greatly. A weighted stack of the up-going and down-going 4D differences based on their similarity will suppress the 4D noises while preserving the signal.

More generally, whenever two independent images are acquired simultaneously, it can be assumed that the signal in both images will be the same but the noise in both images will be different. For deep sea applications these two images could refer to an up-going and a down-going wave-field, as discussed above, but the two independent-but-simultaneous images could also refer to two images obtained in an acquisition with two (nearly) collocated detectors, for instance a pressure sensor and a velocity sensor, with two nearby detectors in an over/under configuration, or with two towed receiver streamers at different depths. Thus, the present concepts can be applied both offshore and onshore. While the foregoing description refers in some instances to up-going and down-going wave-fields, it will be understood that any combination of such independent images could be used.

Figure 2:
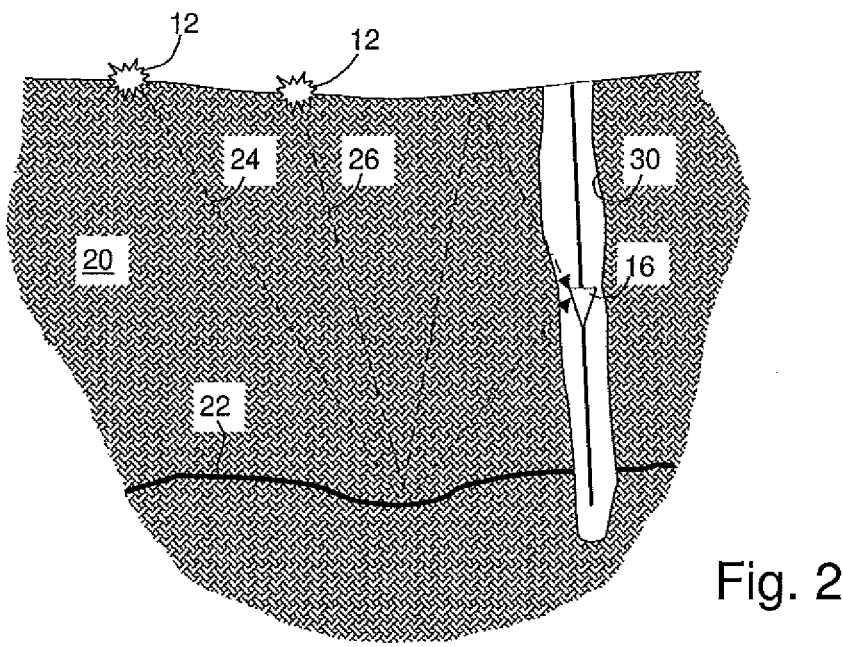
FIG. 2 is a schematic illustration of a VSP seismic system in which the present invention can be used.

In particular, the present invention may be applied to images generated with one or more seismic sources 12 on the surface and one or more receivers 16 in a borehole 30, as in the case of Vertical Seismic Profiling (VSP), illustrated schematically in FIG. 2. The conventional reflection image is generated by migrating the up-going wave-field that arrives at the receivers from reflections below. An image may also be generated using the down-going wave-field by the technique of mirror or multiple migration.

Figure 3:
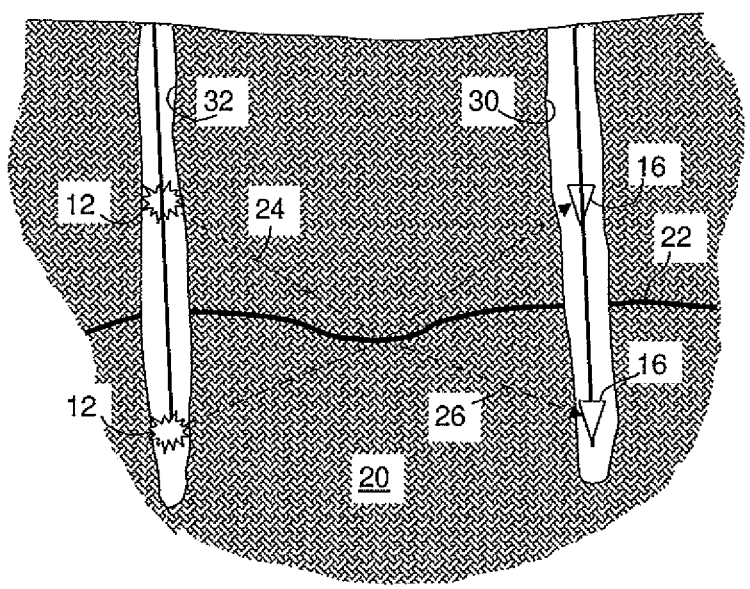
FIG. 3 is a schematic illustration of a cross-well seismic system in which the present invention can be used.

In still other embodiments, illustrated schematically in FIG. 3, the present invention may be applied to images generated with one or more seismic sources 12 in a first borehole 30 and receivers 16 in another, nearby borehole 32, as in the case of cross-well seismic surveying. For a given reflecting interface, one may generate an image using the up-going wave-field 24 which requires the seismic sources and receivers to be located above the interface in question. One may also generate an image using the down-going wave-field 26 which requires seismic sources and receivers to be located below the interface in question. Both situations occur in practice, as seismic sources and receivers are commonly placed above and below the area of interest.

In another embodiment, data may be collected at two or more (n) receivers at different depths or with different wave-fields. One or more weighting functions W can be derived for the aggregated signals belonging to the two or more receivers, respectively and these data can be summed using a multi-receiver (MR) similarity stack that is defined as MR=($R_1W_1+R_2W_2+ \ldots R_n W_n$)/n, where $R_n$ are the receiver data and the weighting functions $W_n$ can be defined as functions of the similarity between each $R_n$ and the other receivers. Two MR similarity stacks based on data collected at different times can then be used to generated a noise-reduced 4D image.

In another embodiment, data may be collected at two or more onshore receivers at different depths. In these instances, it may be desirable to enhance the up-going reflected waves and to attenuate the down-going waves that are reflected from the free-surface, known as receiver ghosts. This can be done after aligning the up-going data, by calculating a weighting function based on the similarity of the two receivers' data and generating a weighted stack as described above. For shallow receivers, the time delay between up-going and down-going waves is may be less than the seismic wavelet length. In addition, seasonal variations in near surface properties can cause seasonal variations in the receiver ghost, affecting the time lapse signal of the reservoir. Accordingly, enhanced suppression of the down-going waves, arriving shortly after the up-going waves, will improve the time lapse signal.

In other variations, the seismic data may comprise VSP data that has been gathered using at least one source on the earth's surface and at least one receiver in a borehole, or the seismic data may be cross-well data that has been gathered using at least one source in a first borehole and at least one receiver in a second borehole. Alternatively, the seismic data may be gathered using at least one source and at least two receivers that are located at different depths and the seismic data at each receiver may contain an up-going wave-field and a down-going wave-field comprising a receiver ghost. In still other variations, the seismic data may be gathered using at least two receiver types, including but not limited to pressure sensors, strain sensors, velocity sensors, and acceleration sensors.

It will be understood that other variations on the invention described above can be made without departing from the scope of the invention, which is set out in the claims that follow. It will be understood that the sequential recitation of steps in the claims is not intended to require that the steps be performed sequentially unless expressly recited or logically required.

What is claimed is:

1. A method, comprising the steps of:
   a) providing seismic data containing information about a subsurface feature in the earth and noise, said subsurface comprising a reservoir, said providing of seismic data comprising:
      i) a first dataset comprising a first up-going wave-field and a first down-going wave-field ($U_1$, $D_1$),
      ii) a second dataset comprising a second up-going wave-field and a second down-going wave-field ($U_2$, $D_2$),
      wherein the second dataset is collected at a time that is later than the first dataset by a time interval;
   b) creating an up-going 4D difference dataset U by subtracting one of the first and second up-going wave-fields $U_1$, $U_2$ from the other and creating a down-going 4D difference dataset D by subtracting one of the first and second down-going wave-fields $D_1$, $D_2$ from the other;
   c) creating a weighting function W that is a function of the similarity of the up-going 4D difference dataset and the down-going 4D difference dataset D;
   e) generating a 4D similarity stack, where the 4D similarity stack is defined as (U+D)*W/2, wherein 4D noise is suppressed and a desired 4D signal containing information about the subsurface feature is preserved; and
   f) delineating a change in said reservoir from said 4D signal.

2. The method according to claim 1 wherein the weighting function W is selected from functions of the group consisting of NRMSD, (1-NRMSD(U,D)/NRMSD_cutoff, $NRMSD^2$, average difference of absolute values, manual weighting, and powers of the foregoing functions.

3. The method according to claim 2 wherein the weighting function W is defined as $W=(1-NRMSD(U,D)/2)$, where $NRMSD(U,D)=2 * RMS(U-D)/[RMS(U)+RMS(D)]$.

4. The method according to claim 1 wherein the seismic data is gathered using at least one source on the water surface and at least one receiver on the seabed.

5. The method according to claim 1, further including the step of aligning $U_1$, $D_1$, $U_2$ and $D_2$ with each other.

6. The method according to claim 1, further including the step of aligning $U_1$ with $U_2$ and aligning $D_1$ with $D_2$.

7. The method according to claim 1, further including the step of aligning the up-going 4D difference dataset U with the down-going 4D difference dataset D.

8. The method according to claim 1, further including the step of scaling the data in at least two datasets so as to equalize the energy in each of a plurality of gates.

9. The method according to claim 8 wherein the weighting function includes a gate and wherein the gate used to scale the data is larger than the gate used in the weighting function.

10. The method according to claim 8 wherein the weighting function is an RMS calculation that includes a gate, wherein the RMS gate is less than 2 wavelengths, and wherein the gate used to scale the data is larger than the RMS gate.

11. The method according to claim 10 wherein the RMS gate is selected to be less than 10 m.

12. The method according to claim 1 wherein the time interval is at least one month.

13. The method according to claim 1 wherein the time interval is at least one year.

14. The method according to claim 1 wherein said first up-going wave-field and said first down-going wave-field ($U_1$, $D_1$) are simultaneously acquired, and wherein said second up-going wave-field and said second down-going wave-field ($U_2$, $D_2$) are simultaneously acquired.

15. A method, comprising the steps of:
   a) providing seismic data containing information about a subsurface feature in the earth and noise, said subsurface comprising a reservoir, said providing of seismic data comprising a primary wave-field and a secondary wave-field ($A_1$, $B_1$);
   b) creating a weighting function W that is a function of the similarity of the primary wave-field $A_1$ and the secondary wave-field $B_1$;
   c) generating a similarity stack, where the similarity stack is defined as ($A_1+B_1$)*W/2 wherein the noise is suppressed and a desired signal containing information about the subsurface feature is preserved;
   d) repeating steps a)-c) after a time interval, and calculating a time-lapse dataset by comparing the resulting two similarity stacks; and
   e) delineating a change in said reservoir from said time-lapse dataset.

16. The method according to claim 15 further including the step of scaling the primary wave-field and the secondary wave-field so as to equalize the energy in each of a plurality of gates.

17. The method according to claim 16 wherein the weighting function includes a gate and wherein the gate used to scale the data is larger than the gate used in the weighting function.

18. The method according to claim 16 wherein the weighting function is an RMS calculation that includes a gate, wherein the RMS gate is less than 2 wavelengths, and wherein the gate used to scale the data is larger than the RMS gate.

19. The method according to claim 15 further including the step of time-aligning the primary wave-field and the secondary wave-field.

20. The method according to claim 15 wherein the seismic data is selected from the groups consisting of: VSP data gathered using at least one source on the earth's surface and at least one receiver in a borehole, cross-well data gathered using at least one source in a first borehole and at least one receiver in a second borehole, data gathered using at least one source and at least two receivers that are located at different depths.

21. The method according to claim 15 wherein the seismic data at each receiver contains an up-going wave-field and a down-going wave-field comprising a receiver ghost.

22. The method according to claim 15 wherein the seismic data is gathered using at least two receiver types, selected from the group consisting of pressure sensors, strain sensors, velocity sensors, and acceleration sensors.

23. The method according to claim 15 wherein the time interval is at least one month.

24. The method according to claim 15 wherein said primary wave-field and said secondary wave-field ($A_1$, $B_1$) are simultaneously acquired.

\* \* \* \* \*